United States Patent
Truong et al.

(10) Patent No.: US 7,539,198 B1
(45) Date of Patent: *May 26, 2009

(54) SYSTEM AND METHOD TO PROVIDE NODE-TO-NODE CONNECTIVITY IN A COMMUNICATIONS NETWORK

(75) Inventors: Alex Truong, Santa Clara, CA (US);
Chandrasekar Krishnamurthy, Sunnyvale, CA (US); Krishna Sundaresan, Sunnyvale, CA (US); Jerry Scott, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 891 days.

This patent is subject to a terminal disclaimer.

(21) Appl. No.: 10/184,660

(22) Filed: Jun. 26, 2002

(51) Int. Cl.
*H04L 12/28* (2006.01)
*H04L 12/56* (2006.01)

(52) U.S. Cl. .................................. 370/395.1; 370/420

(58) Field of Classification Search ................ 370/395, 370/252, 311–318, 335–342, 276, 280, 238.1, 370/217, 395.1, 395.53, 356, 218, 389–391, 370/352–354, 328, 401, 466, 420, 230, 235, 370/331, 329, 332, 396, 536, 468, 395.21, 370/395.4, 410–412, 260, 229, 397, 426, 370/236, 474, 249, 465, 409, 399, 237, 419, 370/246, 238, 239, 400, 430; 760/5; 455/522, 455/69, 436, 439, 276, 456.1, 12.1, 405; 709/226, 227, 202, 224, 200, 219, 232, 228, 709/243, 236, 203, 208, 229, 246, 238, 239; 379/900, 88.18; 707/104; 713/400, 154; 725/118, 148; 719/313; 375/220
See application file for complete search history.

(56) References Cited

U.S. PATENT DOCUMENTS

| | | | | | | |
|---|---|---|---|---|---|---|
| 4,825,206 | A | * | 4/1989 | Brice et al. | ............. | 340/825.02 |
| 5,606,493 | A | * | 2/1997 | Duscher et al. | ................ | 700/5 |
| 5,689,550 | A | * | 11/1997 | Garson et al. | ............ | 379/88.18 |
| 5,781,726 | A | * | 7/1998 | Pereira | ........................ | 709/200 |

(Continued)

FOREIGN PATENT DOCUMENTS

EP 0 869 695 A * 10/1998

(Continued)

OTHER PUBLICATIONS

PCT Notification of Transmittal of The International Search Report or The Declaration for PCT Counterpart Application No. PCT/US03/08693 Containing International Search Report (Jul. 21, 2003).

(Continued)

*Primary Examiner*—Wing Chan
*Assistant Examiner*—Prenell Jones
(74) *Attorney, Agent, or Firm*—Blakely, Sokoloff, Taylor & Zafman LLP (57) ABSTRACT

A system and method to provide node-to-node connectivity in a communications network are disclosed. A virtual connection is established between a source node coupled to a client and a destination node within the connection-oriented network using standards-based signaling. A communication session is then activated between the client and the destination node on the virtual connection.

19 Claims, 8 Drawing Sheets

U.S. PATENT DOCUMENTS

| | | | |
|---|---|---|---|
| 5,903,559 A | 5/1999 | Acharya et al. | |
| 5,918,022 A * | 6/1999 | Batz et al. | 709/236 |
| 6,011,915 A * | 1/2000 | Aaker et al. | 703/23 |
| 6,021,263 A | 2/2000 | Kujoory et al. | |
| 6,185,409 B1 * | 2/2001 | Threadgill et al. | 455/12.1 |
| 6,195,714 B1 | 2/2001 | Li et al. | |
| 6,229,787 B1 * | 5/2001 | Byrne | 370/218 |
| 6,252,878 B1 | 6/2001 | Locklear, Jr. et al. | |
| 6,253,230 B1 | 6/2001 | Couland et al. | |
| 6,343,326 B2 | 1/2002 | Acharya et al. | |
| 6,351,465 B1 * | 2/2002 | Han | 370/395.43 |
| 6,381,238 B1 * | 4/2002 | Hluchyj | 370/352 |
| 6,438,702 B1 * | 8/2002 | Hodge | 713/400 |
| 6,463,062 B1 * | 10/2002 | Buyukkoc et al. | 370/395.1 |
| 6,483,842 B1 * | 11/2002 | Mauger | 370/420 |
| 6,674,713 B1 * | 1/2004 | Berg et al. | 370/217 |
| 6,681,232 B1 * | 1/2004 | Sistanizadeh et al. | 707/104.1 |
| 6,744,734 B1 * | 6/2004 | Iliadis et al. | 370/238.1 |
| 6,757,278 B1 * | 6/2004 | Bi et al. | 370/356 |
| 6,801,502 B1 * | 10/2004 | Rexford et al. | 370/235 |
| 6,822,963 B1 * | 11/2004 | Kavak | 370/395.21 |
| 6,882,643 B1 * | 4/2005 | Mauger et al. | 370/389 |
| 2001/0047392 A1 * | 11/2001 | Murphy, Jr. et al. | 709/208 |
| 2002/0097725 A1 * | 7/2002 | Dighe et al. | 370/395.1 |
| 2003/0009537 A1 * | 1/2003 | Wang | 709/219 |
| 2003/0099192 A1 * | 5/2003 | Scott et al. | 370/229 |
| 2004/0044762 A1 * | 3/2004 | Peacock | 709/224 |
| 2005/0220055 A1 * | 10/2005 | Nelson et al. | 370/331 |

FOREIGN PATENT DOCUMENTS

| | | |
|---|---|---|
| EP | 0869695 A1 | 10/1998 |
| EP | 0957656 A2 | 11/1999 |

OTHER PUBLICATIONS

International Telecommunication Union (ITU), ITU-T, Q.2931. B-ISDN Application Protocols for Access Signaling (Feb. 1995).

The ATM Forun Technical Committee, "ATM User-Network Interface (UNI) Signaling Specification, Version 4.1," With Revision Marks Relative to af-sig-0061.000, ATM Forum document No. af-sig-0061.001 (Apr. 2002).

Discussion of prior art (i.e., art dated prior to Jun. 26, 2002) set forth in Information Disclosure Statement Transmittal attached hereto.

Andreas Hettich, et al., "Routing Protocols for Wireless Ad hoc ATM Networks," IEEE, pp. 49-58 (Jan. 1999).

Robert Salier, et al., "ATM Forum Conformance Testing to Ensure Your P-NNI Implementation is Ready to Plug-and-Play," pp. 293-298 (1999).

"Operations and Maintenance", WAN Products BPX 8600 Series, Chapter 8, pp. 8-1 - 8-32, posted Jan. 19, 2001. http://www.cisco.com.ru/univercd/cc/td/doc/product/wanbu/bpx8600/8_4/esp20/atm1ch08.pdf.

* cited by examiner

ATM signaling protocol stack

SYSTEM AND METHOD TO PROVIDE NODE-TO-NODE CONNECTIVITY IN A COMMUNICATIONS NETWORK

FIELD OF THE INVENTION

The present invention relates generally to a digital communications network. More particularly, the present invention relates to a system and method to provide node-to-node connectivity in the digital communications network.

BACKGROUND OF THE INVENTION

A digital network comprises of a group of nodes that are connected to each other through a variety or interfaces. The network can also be logically considered to comprise several layers including, for example, a physical layer, a data link layer, a network layer, and a transmission layer. In each of these layers, different agreed upon standards that enable various vendor equipment to communicate may be used. The standards are also known as communications protocols.

Asynchronous Transfer Mode ("ATM") or "cell switching" is a technology designed for transmitting digital information such as voice, video, and data at high speeds through the digital network. In the ATM protocol, the digital information to be transferred is first arranged into equal sized units called cells having fixed lengths. The cells are then transmitted from node to node until they reach a destination node through a pathway (or connection) within the digital network.

The communication path between two nodes is established through a virtual circuit. In a virtual circuit, the path may be established and then removed, and resources along the path may be shared by multiple virtual circuits. When the data cells are sent through network switches that established virtual circuits through an automated call-setup procedure, the communication paths are called Switched Virtual Circuits ("SVCs").

The digital network is constructed of digital switches coupled together through digital communication links such as, for example, trunks. The trunks carry the cells of information between the digital switches along the connection. The digital switches route the cells from incoming communication links to outgoing communication links and finally to the destination node.

The ATM protocol can be incorporated into another type of communications protocol, the Transmission Control Protocol/Internet Protocol ("TCP/IP"). The Internet Protocol ("IP") is used to carry out data transmission at the network layer of the digital network, while the Transmission Control Protocol ("TCP") is used at the transport layer. A conventional IP network is typically implemented using routers. A message is divided into packets that have variable lengths, unlike the ATM cells described above. Each router receives a packet and determines an output port to which the packet is to be delivered using an IP address attached to that packet. When packets are processed through the router, the packets may not all take the same path or virtual circuit. Processing packets through a router is advantageous when the applications being performed are small in time and/or bandwidth. However, processing becomes difficult and expensive when the applications have larger requirements.

SUMMARY OF THE INVENTION

A system and method to provide node-to-node connectivity in a communications network are disclosed. A virtual connection is established between a source node coupled to a client and a destination node within the connection-oriented network using standards-based signaling. A communication session is then activated between the client and the destination node on the virtual connection.

Other features and advantages of the present invention will be apparent from the accompanying drawings and from the detailed description, which follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

According to embodiments described herein, a system and method to provide node-to-node connectivity in a communications network are disclosed.

As will be described in more detail below, a virtual connection is established between a source node coupled to a client and a destination node within the connection-oriented network using standards-based signaling. A communication session is then activated between the client and the destination node on the virtual connection.

Figure 1:
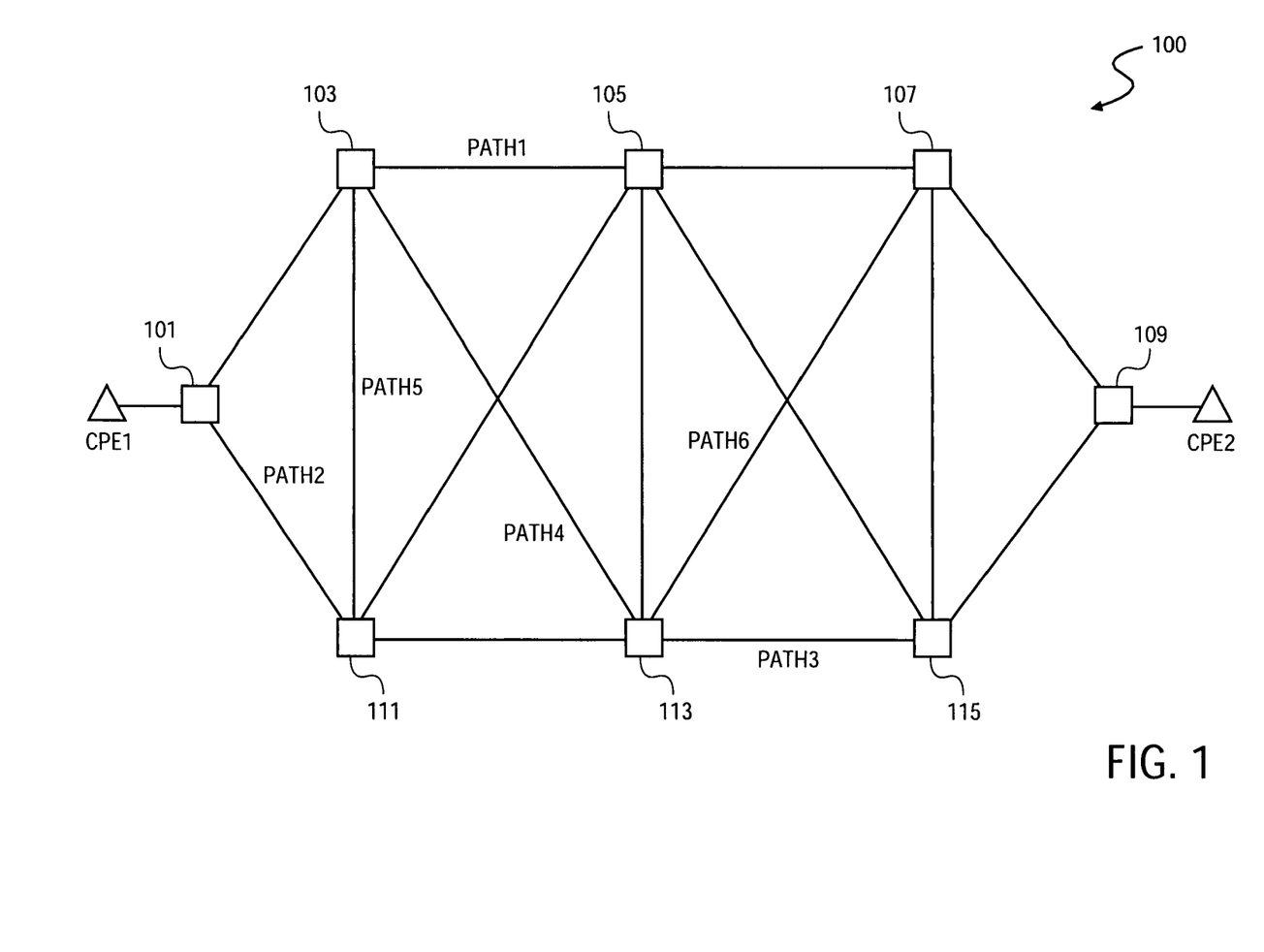
FIG. 1 is an exemplary diagram of a digital communications network environment that includes a plurality of trunks and in which embodiments of the present invention can be implemented.

FIG. 1 illustrates an exemplary diagram of a digital communications network environment that includes a plurality of trunks and in which embodiments of the present invention can be implemented. Referring to FIG. 1, the digital network environment 100 includes a plurality of nodes such as, for example, network switches 101, 103, 105, 107, 109, 111, 113, and 115, which are interconnected through a plurality of trunks. The trunks support the digital network 100 by transferring data, for example, from a starting client CPE1 connected to a starting node 101 to an ending client CPE2 connected to a destination node 109.

The digital network environment 100 may include a variety of networks, such as an asynchronous transfer mode ("ATM") network, a virtual private network ("VPN"), or a combination of virtual private networks and non-virtual private networks. The network 100 includes a plurality of clients coupled with each other through network 100. Client 1 (CPE1) and client 2 (CPE2) can each be a workstation, computer, server, or other similar device, for example.

The plurality of network nodes 101, 103, 106, 107, 109, 111, 113, and 115 are interconnected through a plurality of paths, such as Path 1 through Path 6. A path is a connection between nodes, clients, or end users. A path can include a plurality of paths for connecting any number of nodes within the digital network 100 for transferring data from CPE1 to CPE2. For one embodiment, the path is chosen to be the best route available between clients, such as CPE1 and CPE2, for making a connection at the time a communication request is placed.

Each node in a path is linked to all its neighboring nodes and to all other nodes in the network through the neighboring nodes. A node has a capability of receiving data, processing data, and passing data along to another node. A decision is made at each node to route received data to another node. For example, node 105 may receive data from node 103 and pass the data along to any selected neighborhood node, such as node 111, 113, 115, or 107.

Each node in the path of the cell is an ATM switch coupled to a trunk. The trunks coupled to each ATM switch in the cell path may either be of the same size or a different size. For example, node 103 may be an ATM switch coupled to an OC12 trunk and the node 105 may be an ATM switch coupled to an OC48 trunk.

A plurality of links or trunks may exist between any two nodes in the digital network 100. The plurality of links aid in exchange of data between any two nodes by allowing transportation of cells on the links. The links may be of any form, such as a cable wire, fiber optic line, an RF connection, or a satellite connection. The plurality of links between any two nodes allows multiple communications between the two nodes at any one time.

One type of communication between CPE1 and CPE2 is a call that uses standards-based signaling, such as Private Network-to-Network Interface ("PNNI") and User-Network Interface ("UNI") signaling. The PNNI protocol is a dynamic routing protocol that provides Quality of Service ("QoS") routing support to signaling based on QoS requirements specified in the communication request.

Figure 2:
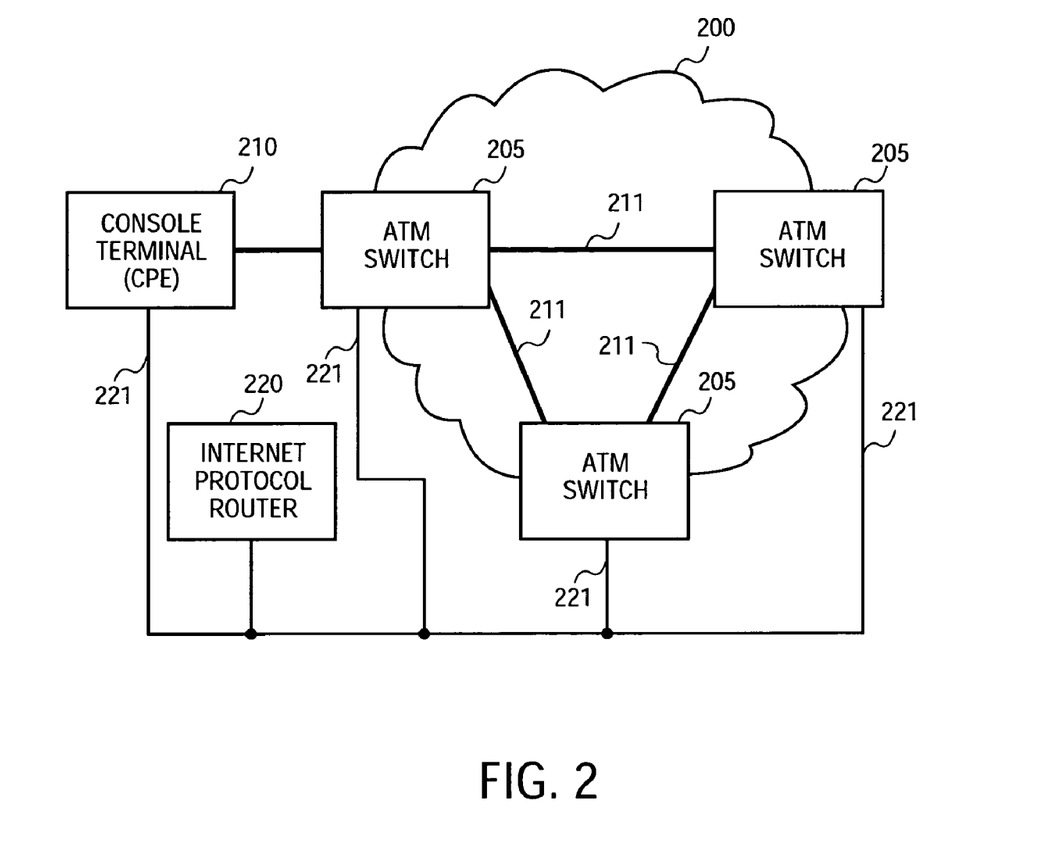
FIG. 2 is an exemplary diagram of the digital network and a parallel IP network used to connect a client to a node within the digital network.

FIG. 2 is an exemplary diagram of the digital network and a parallel IP network used to connect a client to a node within the digital network. As illustrated in FIG. 2, a client 210, such as, for example, a console terminal or CPE, is coupled to a network node 205, such as, for example, an ATM switch, within the network 200. ATM switches 205 are coupled within the network 200 through a plurality of trunks 211.

The CPE 210 physically connects to any switch 205 within the network 200 to establish a communication session, such as, for example a telnet session, with that particular node 205. However, in order to establish an inband telnet session with a remote switch 205, the CPE 210 needs to connect through a private protocol router 220, for example an Internet protocol (IP) router, which is coupled to each switch 205 and to the CPE 210 through communication links 221 and which establishes connectivity with the target remote switch 205. The requirement to provide a second network in order to facilitate activation of such communication sessions with remote nodes within the network 200 results in inefficient and expensive configurations.

Figure 3:
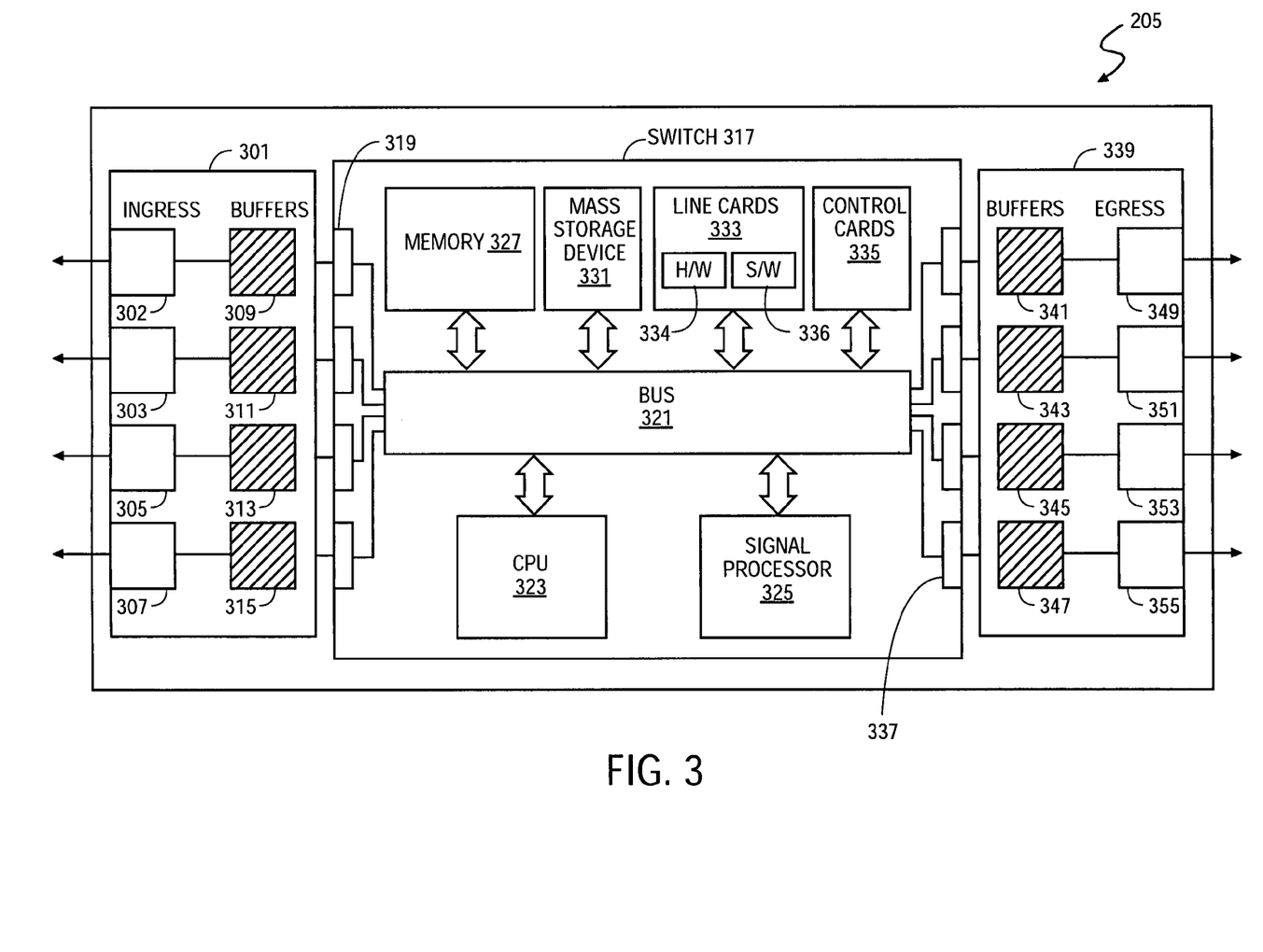
FIG. 3 illustrates a network node capable of receiving, processing, and outputting data according to one embodiment of the present invention.

FIG. 3 illustrates a network node 205 capable of receiving, processing, and outputting data. Network node 205 shown in FIG. 3 is similar to the other network nodes within the network 200.

Network node 205 includes an ingress unit 301, a switch 317, and an egress unit 339. Ingress unit 301 may be coupled to input data links for receiving data from another network node via a trunk coupled to the node. Ingress unit 301 may includes ingress input areas 302-307, and buffering units 309-315 coupled to the ingress areas 302-307 for buffering the received data from the input links. Ingress unit 301 may be coupled to switch 317 for transferring the buffered data to the switch 317.

Switch 317 is an ATM switch. Alternatively, other types of switches may also be used. ATM switch 317 is coupled to a variety of trunks—for example, OC48, OC12, or DS3 trunks.

Switch 317 includes a digital processing system for processing data received by and to be sent by the network node. The digital processing system includes a bus 321 coupled to a plurality of input and output ports 319 and 337, a signal processor 325, a central processing unit ("CPU") 323, a memory 327, a mass storage device 331, a plurality of line cards 333, and a plurality of control cards 335.

For one embodiment, bus 321 is a standard system bus. CPU 323 and signal processor 325 can be used to process information and/or signals for switch 317. Signal processor 325 can be used to process speech or audio information and signals for speech processing and recognition.

Memory 327 can comprise dynamic random access memory ("DRAM") static random access memory ("SRAM"), read-only memory ("ROM"), or other storage devices, for storing data or program codes used by CPU 323 or signal processor 325. For example, memory 327 may store a topology database containing topology information corresponding to other network nodes 205 within the network 200, as described in further detail below. Memory 327 may also store temporary variables or other intermediate information during execution of instructions by CPU 323 or signal processor 325. Mass storage device 331 can be a hard disk drive a floppy disk drive, an optical disk drive, or other mass storage device for storing information or instructions for the switch 317.

Switch 317 may contain four or more line cards 333 and several control cards 335 that control the line cards via bus 321. For one embodiment, the line cards 333 are coupled to four ports 319 and four ports 337 via bus 321. Alternatively, lines card 333 may be coupled to eight, sixteen, or more ports. Each port may support a specific data bit rate. User traffic may be received through one line card and transmitted through another. This cross-connection is determined by a control card 335 upon the establishment of a connection. Typically, each line card also contains a hardware module 334 to accomplish bit-level and cell-level functions (such as recombining, quality of service, etc.) and a software module 336 for reprogramming hardware upon changing connections. The control cards 335 may typically run the various protocols, such as the PNNI protocol, for example, and may contain datagrams for encapsulating resource configuration information within a user definable programmable data unit ("PDU") of a signaling protocol (e.g., the Service Specific Connection Oriented Protocol ("SSCOP")). Alternatively, such software may be implemented elsewhere within the switch 317 or external to the switch 317. Bus 321, CPU 323, signal processor 325, memory 327, mass storage device 331, line cards 333, and control cards 335 communicate to process PNNI packets received from input ports 319.

An egress unit 339 is coupled to switch 317. Egress unit 339 includes a series of buffers 341, 343, 345, and 347 coupled to a series of egress areas 349, 351, 353, and 355. The series of buffers 341, 343, 345, and 347 and egress areas 349, 351, 353, and 355 are selected by the switch 317 based on class of service. The egress unit 339 is coupled to output data links and data is communicated from these output data links to a node designated by the switch 317.

At the switch 317, data is received from the ingress unit 301 and a decision is made to route the data to a particular node. Further functions such as quality of service ("QOS") may be determined by switch 317.

Figure 4:
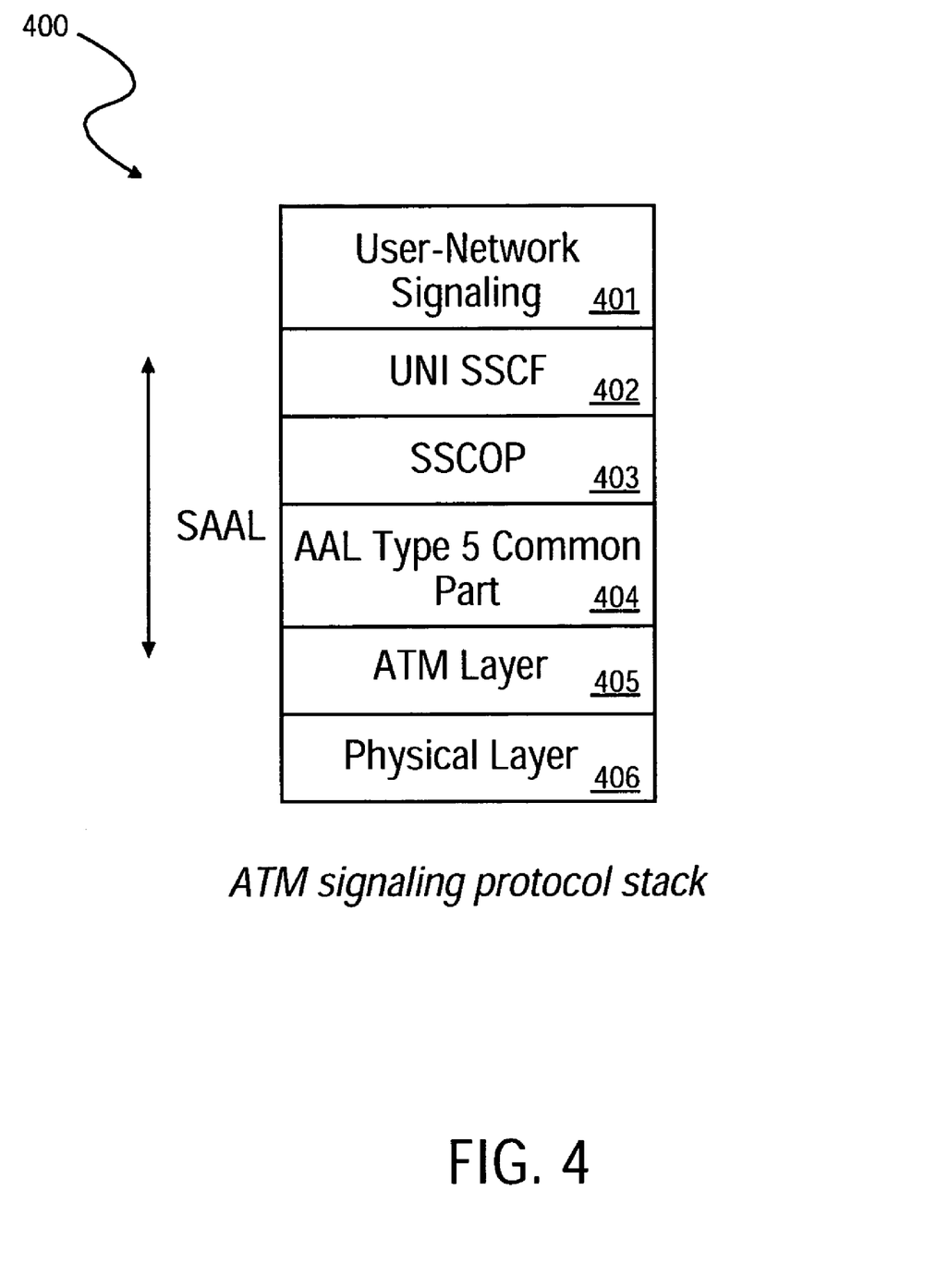
FIG. 4 illustrates an exemplary diagram of an asynchronous transfer mode ("ATM") signaling protocol stack in which embodiments of the present invention can be implemented.

FIG. 4 is a diagram of an ATM signaling protocol stack 400 in which embodiments of the present invention can be implemented. As illustrated in FIG. 4, The ATM signaling protocol stack 400 is used for signaling information between nodes and users of an ATM network, such as network 100 of FIG. 1. Types of information exchanged in an ATM network may include requests for use of network resources, signaling messages, bandwidth allocation factors, and circuit parameters for establishing a virtual circuit path between two users. Other types of signaling can be accomplished using the ATM signaling protocol stack 400.

The ATM signaling protocol stack 400 includes several protocols for connection control signaling, such as User-Network Signaling 401, User Network Interface Service Specific Coordination Function ("UNI SSCF") 402, Service Specific Connection-Oriented Protocol ("SSCOP"), ATM Adaptation Layer ("AAL") Type 5 Common Part 404, ATM Layer 405, and a Physical Layer 406. These protocols are sent over a Signaling ATM Adaptation Layer ("SAAL") to ensure reliable delivery. The SAAL is divided into two parts—namely, a Service Specific Part and a Common Part.

The ATM layer 405 in the ATM signaling protocol stack 400 is used for establishing virtual connections between ATM nodes present in the network 100. The ATM layer uses information contained in each ATM node for configuring the virtual connection. The configuration allows an ATM node to perform functions such as multiplexing and demultiplexing of ATM cells, translating VPI/VCI values, and header modifications. The physical layer 406 in the ATM network has several functions, including frame generation, cell delineation, and bit-level transmission.

The Service Specific Part of the SAAL of the ATM signaling protocol stack 400 includes UNI SSCF 402 and SSCOP 403. The UNI SSCF 402 includes PNNI signaling information. The UNI/PNNI signaling protocols interface with users of the SSCF protocol and SSCOP for reliable delivery of cells to users of digital network 100. The UNI/PNNI protocols perform network signaling functions such as call establishment, call clearing, and negotiation and allocation of bandwidth. UNI/PNNI signaling may also be used to perform network signaling functions.

PNNI is a hierarchical dynamic link state routing protocol. The PNNI protocol contains two distinct areas: routing and signaling. Since signaling makes use of the routing information present in a network node, the two areas are interrelated.

When a call is setup, the signaling messages have to be routed from one ATM switch 205 to another. As a result, each ATM switch 205 needs to build up and maintain a topology database, which stores information about all switches 205 within the network 200 that belong to a peer group. A peer group is a collection of logical nodes that exchange information with other members of the group. In a network with a single hierarchical level, such as network 200, each ATM switch 205 is considered a PNNI node. A single peer group allows all members to maintain an identical view of the group. Each switch 205 maintains the entire topology of the network 200, including status information of paths between nodes and available resources on each node.

The topology database maintained within each switch 205 is a collection of PNNI Topology State Elements ("PTSEs").

Each PTSE describes a piece of topology information. Each ATM switch 205 originates one or more PTSEs, which describe its own environment, and also learns PTSEs originated and advertised from all other switches within the network 200. The information described in the collection of PTSEs will be described in further detail in connection with FIG. 6.

PNNI signaling may be used in a large scale ATM network having multiple hierarchical groups or in single peer groups with a local network. PNNI signaling protocol comprises procedures to dynamically establish, maintain, and clear ATM connections at a private network-to-network interface or a network node interface between two ATM networks or two ATM network nodes. The PNNI signaling protocol is based on the ATM Forum UNI specification and on the International Telecommunications Union ("ITU") Q.2931 specification, but there are some differences between PNNI and the UNI specification and Q.2931.

Figure 5:
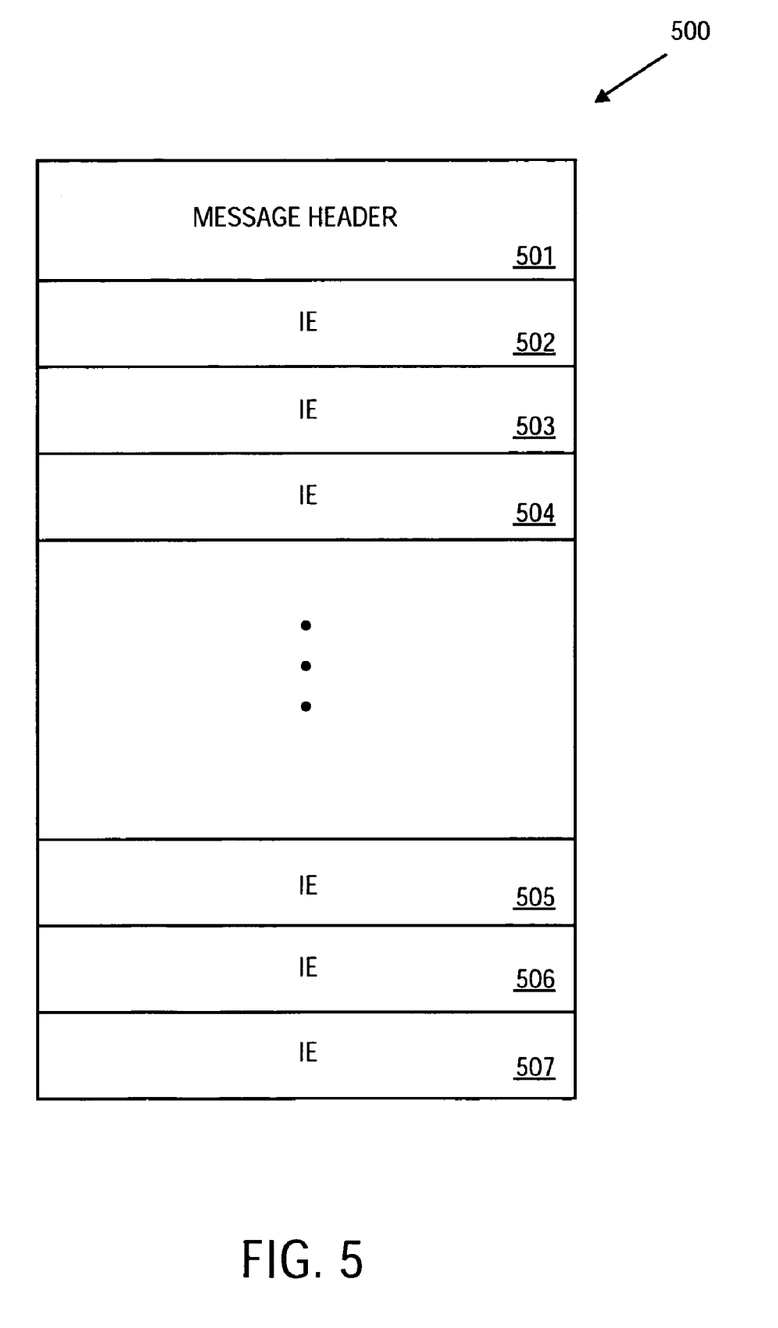
FIG. 5 illustrates the format of a PNNI signaling message.

FIG. 5 illustrates the structure of a PNNI signaling message 500. The PNNI signaling message 500 is comprised of a message header 501 and a variable number of Information Elements ("IEs") 502 through 507. Although six IEs are shown in FIG. 5, more or fewer IEs could also be part of the PNNI signaling message 500.

The message header 501 contains information regarding the PNNI signaling message, such as a protocol discriminator, a call reference value, a message type, and a message length. For one embodiment, the message header 501 is 8 bits wide and contains a plurality of octets.

The PNNI signaling message types include call establishment messages, call clearing messages, miscellaneous messages, and point-to-multipoint messages. In particular, PNNI signaling message types include ALERTING, CALL PROCEEDING, CONNECT, SETUP, RELEASE, RELEASE COMPLETE, NOTIFY, STATUS, STATUS ENQUIRY, RESTART, RESTART ACKNOWLEDGE, STATUS, ADD PARTY, ADD PARTY ACKNOWLEDGE, PARTY ALERTING, ADD PARTY REJECT, DROP PARTY, and DROP PARTY ACKNOWLEDGE.

"SETUP" is one of call establishment message types for PNNI signaling messages. The SETUP PNNI signaling message is sent by the calling user to the network and by the network to the calling user to initiate a call. The SETUP message type is included in message header 501 for a SETUP PNNI signaling message.

The PNNI signaling message 500 includes information elements 502-507. There are several types of information elements. Some may appear only once in the message. Others may appear more than once. Depending on the message type, some information elements are mandatory and some are optional. The order of the information elements does not matter to the signaling protocol. Information elements include, but are not limited to, call state, connection identifier, quality of service parameter, calling party number, called party number, etc. For one embodiment, each of the information elements 502-507 is 8 bits wide and contains a plurality of octets.

Figure 6:
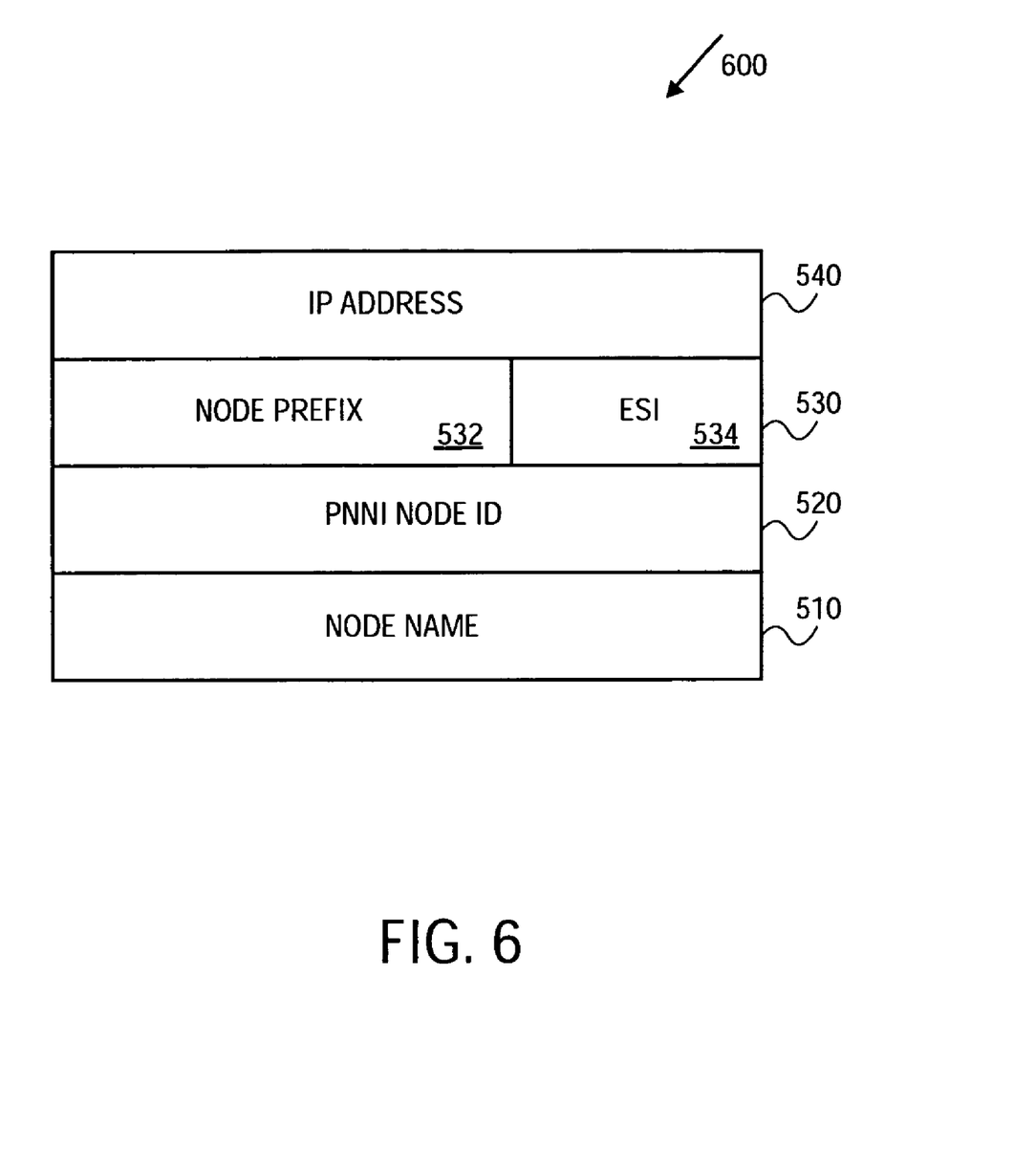
FIG. 6 illustrates an information stack corresponding to each network node, according to one embodiment of the present invention.

FIG. 6 illustrates an information stack corresponding to each network node, according to one embodiment of the present invention. Referring to FIG. 6, for one embodiment, each ATM switch 205 distributes to other switches within the network 200 a collection of PTSEs containing information about its own environment. The topology database maintained within each switch 205 stores that information in an information stack 600. For one embodiment, the information stack 600 specific to an ATM switch 205 includes a node name 510, a node identifier 520, such as, for example, a PNNI Node ID, a node prefix 532, an end system identifier ("ESI") 534 specific to each node, and a private protocol address 540, such as, for example, an IP address belonging to that particular switch 205. The node prefix 532 contains 13 bytes of data and the ESI 534 contains 7 bytes of data. Alternatively, both the node prefix 532 and the ESI 534 may contain a different amount of data. For one embodiment, the node prefix 532 resides within the node identifier 520 and, concatenated with the ESI 534, forms the ATM address 530 of the corresponding ATM switch 205.

For one embodiment of the invention, in the network 200, if a client wants to activate a communication session with a remote destination node 205 via console terminal 210, the client connects physically to a source node 205 and transmits a session setup request containing the node name 510 of the destination node 205 to the source node 205.

The switch 317 within the source node 205 receives the node name 510 of the destination node 205 and performs a query on the topology database stored within the memory 327 to retrieve the private protocol (e.g., Internet Protocol (IP)) address 540 associated with the node name 510 in the information stack 600.

Using the retrieved IP address 540, the switch 317 queries the topology database to retrieve the PNNI node ID 520 corresponding to the destination node 205. Once the node ID 520 is retrieved, the switch 317 assembles the ATM address 530 of the destination node 205 by associating the node prefix 532 with a specific ESI 534 for that destination node.

After the entire ATM address is formed, the switch 317 establishes an SVC call to the destination node 205 via a PNNI signaling message 500, thereby establishing node-to-node connectivity through the network 200 to the destination node 205. The call terminates on the destination node 205 and an IP communication session is attached to the incoming SVC to connect the client with the destination node 205. Applications can subsequently be established on the IP communication session, such as, for example, telnet applications, Simple Network Time Protocol (SNTP) applications, File Transfer Protocol (FTP) applications, or any other applications that can be established on top of the IP communication session. For one embodiment, the SVC call is released once the session is completed.

For an alternate embodiment, in the network 200, if a client wants to activate a communication session with a remote destination node 205 via console terminal 210, the client connects physically to a source node 205 and transmits a session setup request containing the node name 510 of the destination node 205 to the source node 205.

The switch 317 within the source node 205 receives the node name 510 of the destination node 205 and performs a query on the topology database stored within the memory 327 to retrieve the PNNI node ID 520 corresponding to the destination node 205. Once the node ID 520 is retrieved, the switch 317 assembles the ATM address 530 of the destination node 205 by associating the node prefix 532 with a corresponding predetermined ESI 534.

After the entire ATM address is formed, the switch 317 establishes an SVC call to the destination node 205 via a PNNI signaling message 500, thereby establishing node-to-node connectivity through the network 200 to the destination node 205. The call terminates on the destination node 205 and a communication session is attached to the incoming SVC to connect the client with the destination node 205 via a proprietary virtual terminal. Once the session is completed, the SVC call is subsequently released.

Figure 7:
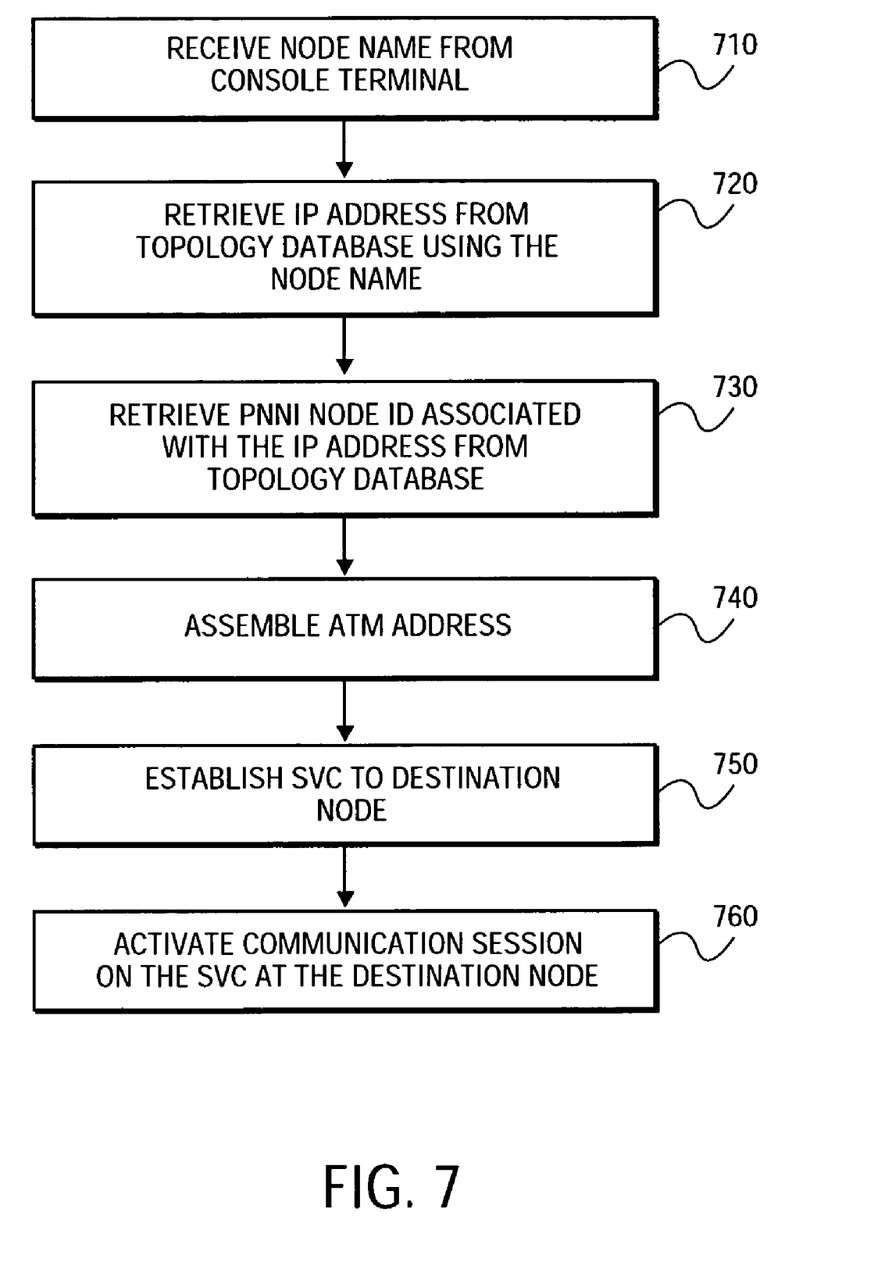
FIG. 7 illustrates a method to provide node-to-node connectivity in the digital network, according to one embodiment of the present invention.

FIG. 7 illustrates a method to provide node-to-node connectivity in the digital network, according to one embodiment of the present invention. According to FIG. 7, at processing block 710, a session setup request containing a node name of the destination node is received from a console terminal 210 connected to a client.

At processing block 720, a private protocol address, such as an IP address, is retrieved from a topology database stored within the source node 205 using the node name of the destination node. At processing block 730, the topology database is queried and a PNNI node identifier associated with the IP address is retrieved from the topology database.

At processing block 740, a network address, such as an ATM address, is assembled by associating a node prefix within the node identifier to an end system identifier (ESI) specific to the destination node. At processing block 750, a switched virtual connection (SVC) is established to the destination node using the assembled ATM address. As a result, node-to-node connectivity is established to the destination node through the network. Finally, at processing block 760, an IP communication session, such as, for example, a telnet session or an SNTP session, is activated between the client and the destination node on the incoming SVC.

Figure 8:
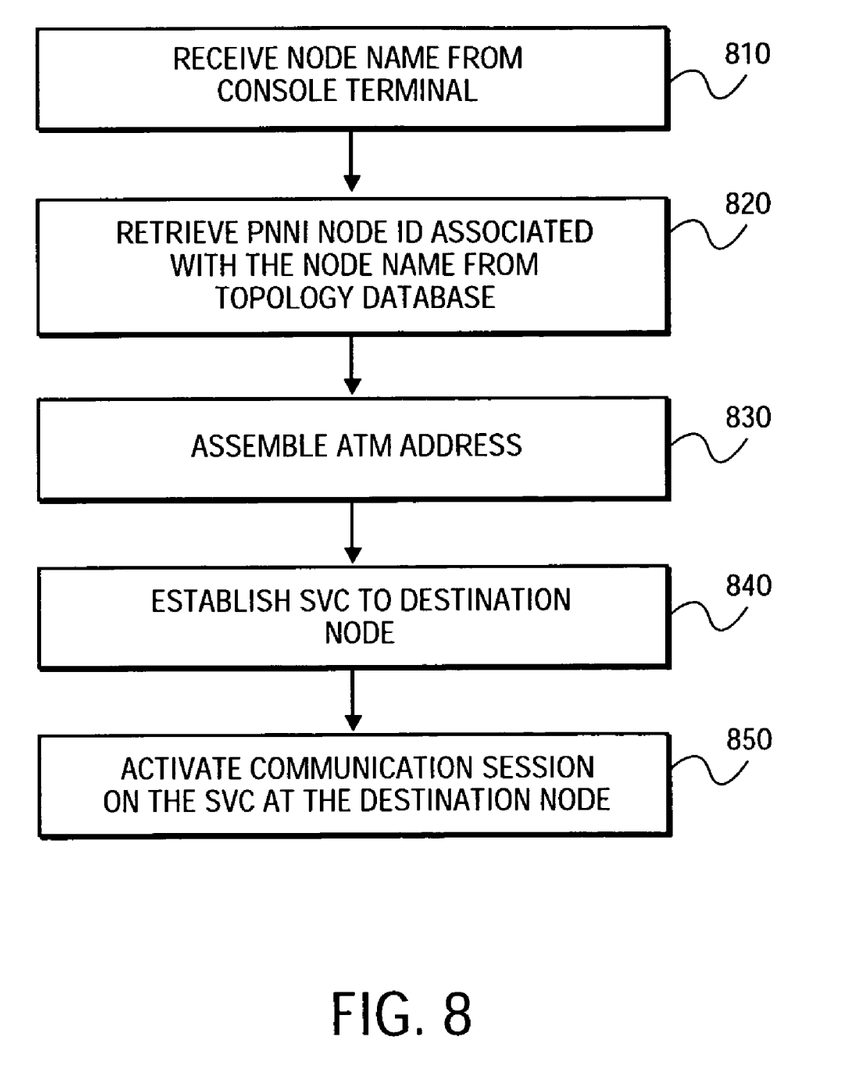
FIG. 8 illustrates a method to provide node-to-node connectivity in the digital network, according to an alternate embodiment of the present invention.

FIG. 8 illustrates a method to provide node-to-node connectivity in the digital network, according to an alternate embodiment of the present invention. According to FIG. 8, at processing block 810, a session setup request containing a node name of the destination node is received from a console terminal 210 connected to a client. At processing block 820, the topology database is queried and a PNNI node identifier associated with the node name is retrieved from the topology database.

At processing block 830, a network address, such as an ATM address, is assembled by associating a node prefix within the node identifier to an end system identifier (ESI) specific to the destination node. At processing block 840, a switched virtual connection (SVC) is established to the destination node using the assembled ATM address. As a result, connectivity is established to the destination node through the network. Finally, at processing block 850, a communication session is activated between the client and the destination node on the incoming SVC.

Thus, a system and method to provide node-to-node connectivity in a communications network have been disclosed. Embodiments of the present invention may be implemented in software programs executed on some form of a processing core (such as a signal processor or a central processing unit of a microprocessor or microcontroller) or otherwise implemented or realized upon or within a machine-readable or computer readable medium. A machine-readable medium includes any mechanism for storing or transmitting information in a form readable by a machine (e.g., a computer or a switch). For example, a machine readable medium includes read-only memory ("ROM"); random-access memory ("RAM"); magnetic disk storage media; optical storage media; flash memory devices; electrical, optical, acoustical, or other form of propagated signals (i.e., carrier waves, infrared signals, digital signals, etc.); or any other type of media suitable to store or to transmit information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. In a connection-oriented networking environment, a method comprising:
   establishing a virtual connection between a source node coupled to a client and a destination node within a connection-oriented network using standards-based signaling;
   activating a communication session between said client and said destination node on said virtual connection, wherein said establishing further comprises:
   receiving a session setup request from said client, said session setup request including a node name of said destination node;
   assembling a network address of said destination node using said node name; and
   retrieving a private protocol address from a topology database using said node name.

2. The method according to claim 1, wherein said assembling further comprises:
   retrieving a node identifier associated with said protocol address from said topology database; and
   associating a node prefix within said node identifier to an end system identifier specific to said destination node to assemble said network address.

3. The method according to claim 2, wherein said virtual connection is a switched virtual connection (SVC).

4. The method according to claim 2, wherein said node identifier is specifically assigned to said destination node in said PNNI protocol.

5. The method according to claim 2, wherein said private protocol address is an Internet protocol (IP) address.

6. The method according to claim 2, wherein said topology database is formed using said standards-based signaling and resides within said source node.

7. The method according to claim 1, wherein said assembling further comprises:
   retrieving a node identifier associated with said node name from said topology database; and
   associating a node prefix within said node identifier to an end system identifier specific to said destination node to assemble said network address.

8. A network system comprising:
   means for establishing a virtual connection between a source node, being an asynchronous transfer mode (ATM) switch, coupled to a client and a destination node within a connection-oriented network using standards-based signaling;
   means for activating a communication session between said client and said destination node on said virtual connection without using an Internet Protocol (IP) router, wherein said standards-based signaling is private network-to-network interface (PNNI) protocol signaling; and
   means for receiving a session setup request from said client, said session setup request including a node name of said destination node;
   means for assembling a network address of said destination node using said node name; and
   means for retrieving a private protocol address from a topology database using said node name.

9. The network system according to claim 8, further comprising:
   means for retrieving a node identifier associated with said protocol address from said topology database; and
   means for associating a node prefix within said node identifier to an end system identifier specific to said destination node to assemble said network address.

10. The network system according to claim 9, wherein said node identifier is specifically assigned to said destination node in said PNNI protocol.

11. The network system according to claim 9, wherein said private protocol address is an Internet protocol (IP) address.

12. The network system according to claim 8, further comprising:
   means for retrieving a node identifier associated with said node name from said topology database; and
   means for associating a node prefix within said node identifier to an end system identifier specific to said destination node to assemble said network address.

13. An asynchronous transfer mode (ATM) switch for a digital network, comprising:
   a processor to establish a virtual connection between the ATM switch coupled to a client and a destination node within a connection-oriented network using standards-based signaling and to activate a communication session between said client and said destination node on said virtual connection, wherein said standards-based signaling is private network-to-network interface (PNNI) protocol signaling, and wherein said processor further receives a session setup request from said client, said session setup request including a node name of said destination node, assembles a network address of said destination node using said node name and retrieves a private protocol address from a topology database using said node name.

14. The switch according to claim 13, wherein said processor further retrieves a node identifier associated with said protocol address from said topology database, and associates a node prefix within said node identifier to an end system identifier specific to said destination node to assemble said network address.

15. The switch according to claim 14, wherein said node identifier is specifically assigned to said destination node in said PNNI protocol.

16. The switch according to claim 14, wherein said private protocol address is an Internet protocol (IP) address.

17. The switch according to claim 14, wherein said topology database is formed using said standards-based signaling and resides within said ATM switch.

18. The switch according to claim 13, wherein said processor further retrieves a node identifier associated with said node name from a topology database, and associates a node prefix within said node identifier to an end system identifier specific to said destination node to assemble said network address.

19. The method according to claim 1, wherein said standards-based signaling is Private Network-to-Network Interface (PNNI) protocol signaling.

* * * * *